(12) United States Patent
Chatterjee et al.

(10) Patent No.: US 8,799,595 B1
(45) Date of Patent: Aug. 5, 2014

(54) ELIMINATING DUPLICATE DATA IN STORAGE SYSTEMS WITH BOOT CONSOLIDATION

(75) Inventors: Paresh Chatterjee, Fremont, CA (US); Ajit Narayanan, Chennai (IN); Sharon Enoch, Newark, CA (US); Vijayarankan Muthirisavengopal, Fremont, CA (US)

(73) Assignee: American Megatrends, Inc., Norcross, GA (US)

( * ) Notice: Subject to any disclaimer, the term of this patent is extended or adjusted under 35 U.S.C. 154(b) by 826 days.

(21) Appl. No.: 12/200,279

(22) Filed: Aug. 28, 2008

Related U.S. Application Data

(60) Provisional application No. 60/969,032, filed on Aug. 30, 2007.

(51) Int. Cl.
*G06F 11/00* (2006.01)
*G06F 11/14* (2006.01)
*G06F 11/20* (2006.01)

(52) U.S. Cl.
CPC ........ *G06F 11/1456* (2013.01); *G06F 11/2074* (2013.01); *G06F 11/2071* (2013.01)
USPC ...................................................... 711/162

(58) Field of Classification Search
USPC ...................................................... 711/162
See application file for complete search history.

(56) References Cited

U.S. PATENT DOCUMENTS

| | | | |
|---|---|---|---|
| 4,942,579 A | 7/1990 | Goodlander et al. | |
| 5,257,367 A | 10/1993 | Goodlander et al. | |
| 5,530,850 A | 6/1996 | Ford et al. | |
| 5,720,027 A | 2/1998 | Sarkozy et al. | |
| 5,732,238 A | 3/1998 | Sarkozy | |
| 5,732,265 A * | 3/1998 | Dewitt et al. | 1/1 |
| 5,771,354 A * | 6/1998 | Crawford | 709/229 |
| 5,790,774 A | 8/1998 | Sarkozy | |
| 5,819,292 A * | 10/1998 | Hitz et al. | 1/1 |
| 5,822,773 A | 10/1998 | Pritchard et al. | |
| 5,893,919 A | 4/1999 | Sarkozy et al. | |
| 5,974,426 A | 10/1999 | Lee et al. | |
| 5,990,810 A * | 11/1999 | Williams | 341/51 |
| 6,098,128 A | 8/2000 | Velez-McCaskey et al. | |

(Continued)

OTHER PUBLICATIONS

U.S. Appl. No. 12/274,000, filed Nov. 19, 2008 entitled "Data De-duplication for Information Storage Systems", Inventors: Chatterjee et al.

(Continued)

*Primary Examiner* — Matthew Bradley
*Assistant Examiner* — Craig Goldschmidt
(74) *Attorney, Agent, or Firm* — Meunier Carlin & Curfman, LLC

(57) ABSTRACT

Technologies for eliminating duplicate data provisions within a storage system supporting boot consolidation can efficiently identify duplicate data provisions within a data storage system and eliminate duplication by remapping duplicate provisions to point to the same physical storage space. Signatures of provisions within a storage system may be calculated and compared. Matching, or collisions, within the list of provision signatures can indicate candidate provisions for de-duplication. De-duplication territories may be provided as an indirect mapping mechanism in support of the remapping of duplicated provisions. Access statistics associated with provisions within a storage system may be collected. Access statistics can support the scheduling of de-duplication processes. Data de-duplication can support substantial storage space consolidation and significantly improve caching efficiency within a data storage system.

20 Claims, 6 Drawing Sheets

(56) References Cited

U.S. PATENT DOCUMENTS

| | | | |
|---|---|---|---|
| 6,298,425 B1 | 10/2001 | Whitaker et al. | |
| 6,366,988 B1* | 4/2002 | Skiba et al. | 711/165 |
| 6,434,681 B1 | 8/2002 | Armangau | |
| 6,460,054 B1 | 10/2002 | Grummon | |
| 6,892,211 B2 | 5/2005 | Hitz et al. | |
| 7,043,637 B2 | 5/2006 | Bolosky et al. | |
| 7,072,916 B1 | 7/2006 | Lewis et al. | |
| 7,080,104 B2* | 7/2006 | Ring et al. | 1/1 |
| 7,111,026 B2 | 9/2006 | Sato | |
| 7,308,536 B2 | 12/2007 | Arimilli et al. | |
| 7,373,366 B1 | 5/2008 | Chatterjee et al. | |
| 7,424,514 B2 | 9/2008 | Noble et al. | |
| 7,454,571 B1 | 11/2008 | Sucharitakul | |
| 7,457,934 B2 | 11/2008 | Yagawa | |
| 7,536,529 B1 | 5/2009 | Chatterjee et al. | |
| 7,747,584 B1* | 6/2010 | Jernigan, IV | 707/692 |
| 7,840,537 B2 | 11/2010 | Gokhale et al. | |
| 8,332,844 B1 | 12/2012 | Kulkarni et al. | |
| 2002/0161983 A1 | 10/2002 | Milos et al. | |
| 2003/0115301 A1* | 6/2003 | Koskimies | 709/221 |
| 2003/0126242 A1 | 7/2003 | Chang | |
| 2003/0163630 A1 | 8/2003 | Aasheim et al. | |
| 2004/0030727 A1 | 2/2004 | Armangau et al. | |
| 2004/0128470 A1 | 7/2004 | Hetzler et al. | |
| 2006/0218364 A1 | 9/2006 | Kitamura | |
| 2007/0075694 A1 | 4/2007 | Xi et al. | |
| 2007/0192763 A1* | 8/2007 | Helvick | 717/168 |
| 2007/0255758 A1* | 11/2007 | Zheng et al. | 707/200 |
| 2008/0005141 A1* | 1/2008 | Zheng et al. | 707/101 |
| 2008/0104107 A1 | 5/2008 | Schwaab et al. | |
| 2008/0229040 A1 | 9/2008 | Honma | |
| 2008/0243879 A1 | 10/2008 | Gokhale et al. | |
| 2009/0007261 A1* | 1/2009 | Smith | 726/21 |
| 2010/0017591 A1 | 1/2010 | Smith et al. | |

OTHER PUBLICATIONS

U.S. Appl. No. 12/355,439, filed Jan. 16, 2009 entitled "Boot Caching for Boot Acceleration within Data Storage Systems", Inventors: Chatterjee et al.

U.S. Appl. No. 12/435,602, field May 5, 2009 entitled "Boot Acceleration by Consolidating Client Specific Boot Data in a Data Storage System", Inventors: Chatterjee et al.

U.S. Appl. No. 12/425,123, filed Apr. 16, 2009 entitled "Provisioning Space in a Data Storage System", Inventors: Chatterjee et al.

U.S. Notice of Allowance / Allowability dated Jan. 12, 2009 in U.S. Appl. No. 11/254,347.

U.S. Appl. No. 11/254,347, filed Oct. 20, 2005, entitled: "Method, System, Apparatus, and Computer-Readable Medium for Provisioning Space in a Data Storage System," Inventors Chatterjee et al.

U.S. Appl. No. 11/255,146, filed Oct. 20, 2005, entitled: "Method, System, Apparatus, and Computer-Readable Medium for Taking and Managing Snapshots of a Storage Volume," Inventors: Chatterjee et al.

U.S. Appl. No. 12/042,705, filed Mar. 5, 2008, entitled "Method, System, Apparatus, and Computer-Readable Medium for Taking and Managing Snapshots of a Storage Volume," Inventors: Chatterjee et al.

U.S. Appl. No. 12/042,710, filed Mar. 5, 2008, entitled "Method, System, Apparatus, and Computer-Readable Medium for Taking and Managing Snapshots of a Storage Volume," Inventors: Chatterjee et al.

U.S. Appl. No. 12/042,715, filed Mar. 5, 2008, entitled "Method, System, Apparatus, and Computer-Readable Medium for Taking and Managing Snapshots of a Storage Volume," Inventors: Chatterjee et al.

U.S. Appl. No. 12/101,236, filed Apr. 11, 2008, entitled "Data Migration Between Multiple Tiers in a Storage System Using Age and Frequency Statistics," Inventors: Chatterjee et al.

U.S. Appl. No. 12/101,241, filed Apr. 11, 2008, entitled "Allocating Background Workflows in a Data Storage System Using Autocorrelation," Inventors: Chatterjee et al.

U.S. Appl. No. 12/101,251, filed Apr. 11, 2008, entitled "Allocating Background Workflows in a Data Storage System Using Historical Data," Inventors: Chatterjee et al.

U.S. Appl. No. 12/104,116, filed Apr. 16, 2008, entitled "Writable Snapshots for Boot Consolidation," Inventors: Chatterjee et al.

U.S. Official Action dated Sep. 4, 2007 in U.S. Appl. No. 11/254,347.

U.S. Official Action dated Mar. 18, 2008 in U.S. Appl. No. 11/254,347.

U.S. Official Action dated Aug. 4, 2006 in U.S. Appl. No. 11/255,146.

U.S. Official Action dated Nov. 17, 2006 in U.S. Appl. No. 11/255,146.

U.S. Official Action dated Aug. 22, 2007 in U.S. Appl. No. 11/255,146.

U.S. Notice of Allowance dated Dec. 11, 2007 in U.S. Appl. No. 11/255,146.

Douglis et al., "Log-Structured File Systems," IEEE, 1989, pp. 124-129.

Green et al., "Designing a Fast, On-line Backup System for a Log-Structured File System," Digital Technical Journal, vol. 8, No. 2, 1996, pp. 32-45.

Peterson et al. "Ext3cow: A Time-Shifting File System for Regulatory Compliance," ACM Transactions on Storage, vol. 1, No. 2, May 2005, pp. 190-212.

Rosenblum et al., "The Design and Implementation of a Log-Structured File System," ACM Transactions on Computer Systems, vol. 10, No. 1, Feb. 1992, pp. 26-52.

U.S. Official Action dated Oct. 8, 2008 in U.S. Appl. No. 11/254,347.

U.S. Official Action, dated Sep. 19, 2011, received in connection with related U.S. Appl. No. 12/435,602.

U.S. Official Action, dated Jan. 5, 2012, received in connection with related U.S. Appl. No. 12/355,439.

US 6,988,220, 01/2006, Eng et al. (withdrawn)

* cited by examiner

ELIMINATING DUPLICATE DATA IN STORAGE SYSTEMS WITH BOOT CONSOLIDATION

CROSS-REFERENCE TO RELATED APPLICATION

This application claims the benefit of U.S. provisional patent application No. 60/969,032, filed on Aug. 30, 2007, entitled "Eliminating De-Dupes with Boot Consolidation," which is expressly incorporated herein by reference in its entirety.

BACKGROUND

Modern information systems are expected to store large amounts of information and protect the information from loss or corruption. Snapshots have become a preferred method of protecting a data storage volume against inadvertent data loss and for performing background backups. A read-only snapshot is a non-writable volume that is a point-in-time image of a data storage volume that can be created, mounted, deleted, and rolled back onto the data storage volume arbitrarily. Such snapshots are utilized extensively in the data storage industry for security, backup, and archival purposes. A writeable snapshot is initially an image of a read-only parent snapshot. The writeable snapshot may be written to and modified without affecting the read-only parent snapshot. The writeable snapshot may be said to branch off of the read-only parent since modifications to the writable snapshot can cause the writable snapshot to diverge from the content of the read-only parent snapshot.

Boot consolidation allows multiple machines to boot from a single server or a single networked storage device. Snapshots can be used for boot consolidation by providing a separate snapshot on a server for each machine to boot from. To accomplish this, a single operating system image may be installed and configured before multiple snapshots of that single installation are created to use for booting multiple client machines.

As the client machines use their snapshots, data is generally written to each of the client snapshots causing them to diverge from one another. However, in many instances a substantial portion of data may be duplicated across multiple client snapshots. For example, when a system upgrade or software installation is performed at multiple clients, the change to the client snapshots may be substantially the same. Having identical data duplicated across multiple client snapshots on a data storage system may be considered a waste of valuable storage space. Such duplication may also have a low caching efficiency since identical data reads are made from different storage locations and thus are not identified as cache hits.

It is with respect to these considerations and others that the disclosure made herein is presented.

SUMMARY

Technologies are described herein for eliminating duplicate data provisions within a storage system supporting boot consolidation. The de-duplication technology presented herein can efficiently identify duplicate data provisions within a data storage system and eliminate duplication by remapping duplicate provisions to point to the same physical storage space. Such de-duplication can support substantial storage space consolidation and may be agnostic of operating system usage, upgrade processes, or various software installations. The resulting elimination of duplicated data can also significantly improve caching efficiency within the data storage system.

According to one embodiment, signatures of provisions within a storage system may be calculated and compared. Matching, or collisions, within the list of provision signatures can indicate candidate provisions for de-duplication. Once candidate provisions are identified from signature collisions, more exhaustive comparisons can be performed to verify that the candidate provisions are indeed complete duplicates of one another.

According to another embodiment, duplicated provisions may be remapped to point to a common area of physical storage. Since the data is duplicated between the duplicate provisions, the same physical area can be used to store the data a single time. The single storage can be more efficient than storing the data repeatedly. De-duplication territories may be provided as an indirect mapping mechanism in support of the remapping of duplicated provisions.

According to yet another embodiment, access statistics associated with provisions within a storage system may be collected and used to identify less frequently used provisions. The less frequently accessed provisions can be checked first for de-duplication since they are less likely to be in use. Also, the most frequently accessed provisions can be checked for de-duplication just after an upgrade or installation process since those provisions may have been similarly modified by the upgrade or installation. Access information may also identify periods of reduced load on a storage system. Such periods of low load may be exploited as opportunities to perform de-duplication operations with reduced impact on production storage performance.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
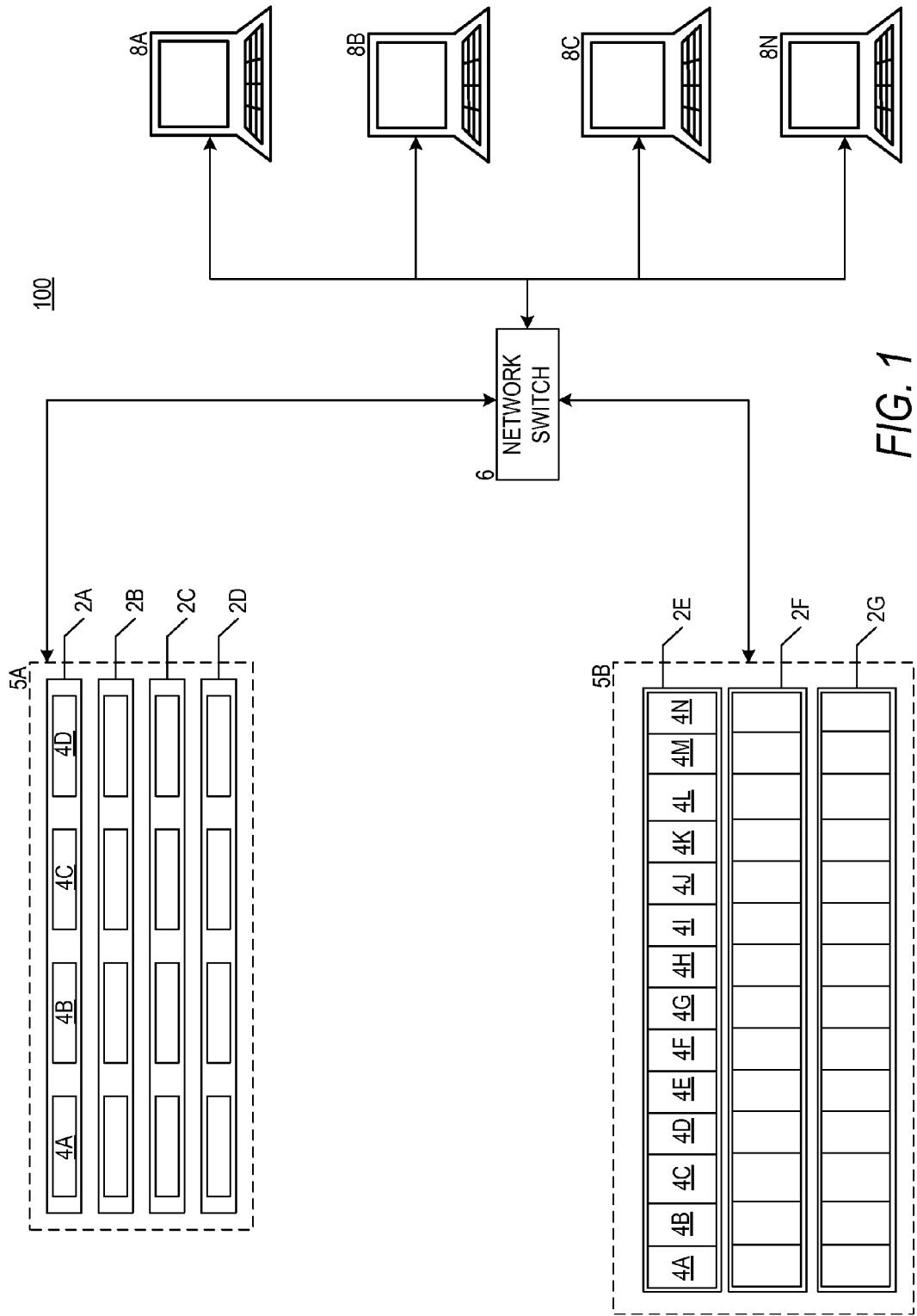
FIG. 1 is a network architecture diagram illustrating aspects of a storage system according to one exemplary embodiment.

The following detailed description is directed to technologies for eliminating duplicate provisions within a data storage system. Through the use of the embodiments presented herein, technologies for identifying and eliminating duplicate provisions within a data storage system can increase both storage efficiency and caching efficiency of the storage system.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration specific embodiments or examples. Referring now to the drawings, in which like numerals represent like elements through the several figures, aspects of a computing system and methodology for eliminating duplicate provisions within a data storage system will be described.

Turning now to FIG. 1, details will be provided regarding an illustrative operating environment for the implementations presented herein, as well as aspects of several software components that provide the functionality described herein for continuous data protection. In particular, FIG. 1 is a network architecture diagram showing aspects of a storage system 100 that includes several virtualized clusters 5A-5B. A virtualized cluster is a cluster of different storage nodes that together expose a single storage device. In the example storage system 100 shown in FIG. 1, the clusters 5A-5B (collectively, clusters 5) include storage server computers 2A-2G (also referred to herein as "storage nodes" or a "node", collectively nodes 2) that are operative to read and write data to one or more mass storage devices, such as hard disk drives. The cluster 5A includes the nodes 2A-2D and the cluster 5B includes the nodes 2E-2G. All of the nodes 2 in a cluster 5 can be physically housed in the same rack, located in the same building, or distributed over geographically diverse locations, such as various buildings, cities, or countries.

According to implementations, the nodes within a cluster may be housed in a one rack space unit storing up to four hard disk drives. For instance, the node 2A is a one rack space computing system that includes four hard disk drives 4A-4D (collectively, disks 4). Alternatively, each node may be housed in a three rack space unit storing up to fifteen hard disk drives. For instance, the node 2E includes fourteen hard disk drives 4A-4N. Other types of enclosures may also be utilized that occupy more or fewer rack units and that store fewer or more hard disk drives. In this regard, it should be appreciated that the type of storage enclosure and number of hard disk drives utilized is not generally significant to the implementation of the embodiments described herein. Any type of storage enclosure and virtually any number of hard disk devices or other types of mass storage devices may be utilized.

As shown in FIG. 1, multiple storage nodes may be configured together as a virtualized storage cluster. For instance, the nodes 2A-2D have been configured as a storage cluster 5A and the nodes 2E-2G have been configured as a storage cluster 5B. In this configuration, each of the storage nodes 2A-2G is utilized to handle I/O operations independently, but are exposed to the initiator of the I/O operation as a single device. It should be appreciated that a storage cluster may include any number of storage nodes. A virtualized cluster in which each node contains an independent processing unit, and in which each node can field I/Os independently (and route them according to the cluster layout) is called a horizontally virtualized or peer cluster. A cluster in which each node provides storage, but the processing and mapping is done completely or primarily in a single node, is called a vertically virtualized cluster.

Data may be striped across the nodes of each storage cluster. For instance, the cluster 5A may stripe data across the storage nodes 2A, 2B, 2C, and 2D. The cluster 5B may similarly stripe data across the storage nodes 2E, 2F, and 2G. Striping data across nodes generally ensures that different I/O operations are fielded by different nodes, thereby utilizing all of the nodes simultaneously, and that the same I/O operation is not split between multiple nodes. Striping the data in this manner provides a boost to random I/O performance without decreasing sequential I/O performance.

According to embodiments, each storage server computer 2A-2G includes one or more network ports operatively connected to a network switch 6 using appropriate network cabling. It should be appreciated that, according to embodiments of the invention, Ethernet or Gigabit Ethernet may be utilized. However, it should also be appreciated that other types of suitable physical connections may be utilized to form a network of which each storage server computer 2A-2G is a part. Through the use of the network ports and other appropriate network cabling and equipment, each node within a cluster is communicatively connected to the other nodes within the cluster. Many different types and number of connections may be made between the nodes of each cluster. Furthermore, each of the storage server computers 2A-2G need not be connected to the same switch 6. The storage server computers 2A-2G can be interconnected by any type of network or communication links, such as a LAN, a WAN, a MAN, a fiber ring, a fiber star, wireless, optical, satellite, or any other network technology, topology, protocol, or combination thereof.

Each cluster 5A-5B is also connected to a network switch 6. The network switch 6 is connected to one or more client computers 8A-8N (also referred to herein as "initiators"). It should be appreciated that other types of networking topologies may be utilized to interconnect the clients and the clusters 5A-5B. It should also be appreciated that the initiators 8A-8N may be connected to the same local area network ("LAN") as the clusters 5A-5B or may be connected to the clusters 5A-5B via a distributed wide area network, such as the Internet. An appropriate protocol, such as the Internet Small Computer Systems Interface ("iSCSI") protocol may be utilized to enable the initiators 8A-8D to communicate with and utilize the various functions of the storage clusters 5A-5B over a wide area network such as the Internet.

Two or more disks 4 within each cluster 5A-5B or across clusters 5A-5B may be mirrored for data redundancy and protection against failure of one, or more, of the disks 4.

Examples of the disks 4 may include hard drives, spinning disks, stationary media, non-volatile memories, or optically scanned media; each, or in combination, employing magnetic, capacitive, optical, semiconductor, electrical, quantum, dynamic, static, or any other data storage technology. The disks 4 may use IDE, ATA, SATA, PATA, SCSI, USB, PCI, Firewire, or any other bus, link, connection, protocol, network, controller, or combination thereof for I/O transfers.

Storage volume snapshots and continuous data protection features may be provided on one or more storage server computers 2A-2G, one or more storage clusters 5A-5B, or one or more client computers 8A-8N. Furthermore, the processes for implementing CDP or snapshots for CDP may execute on any of these systems or may operate in a distributed fashion with components executing across two or more of these systems.

Figure 2:
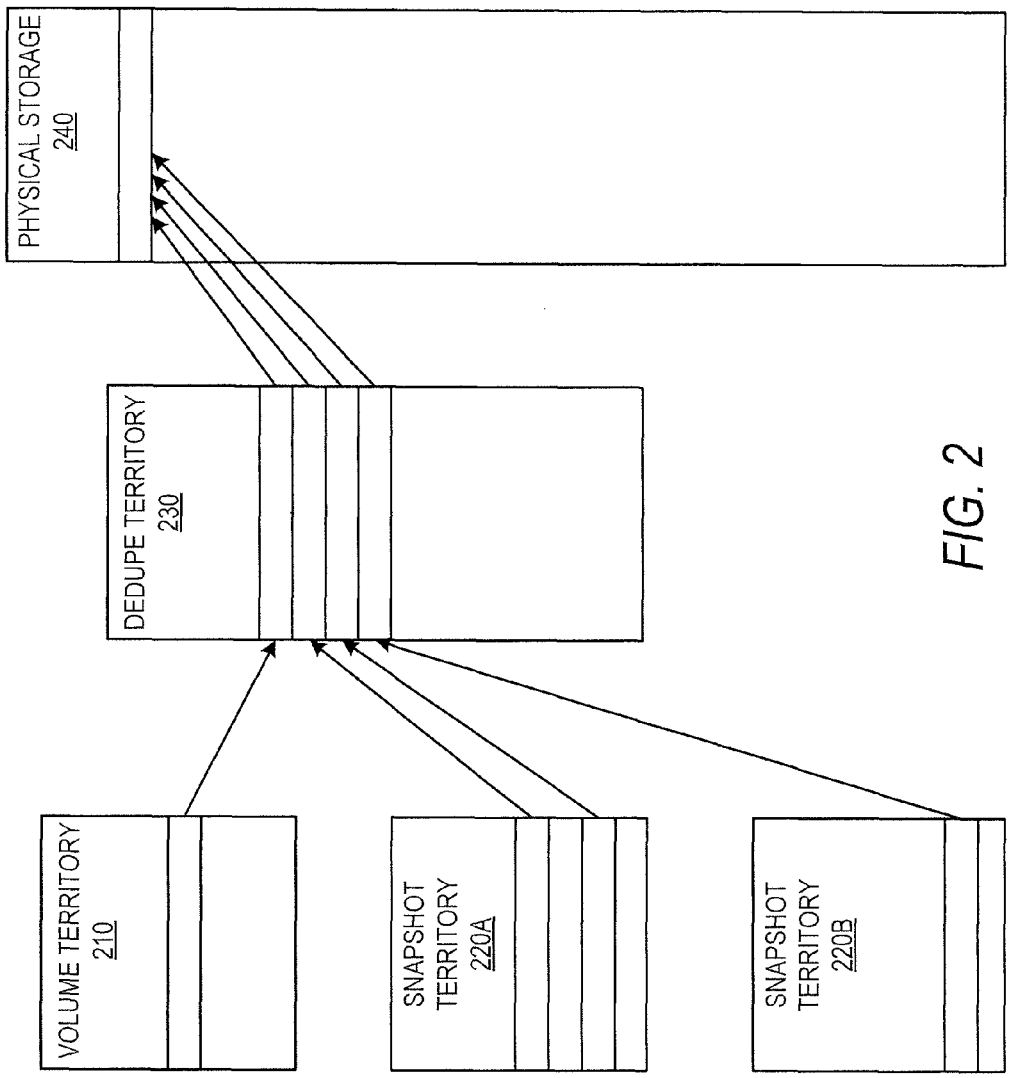
FIG. 2 is a data structure diagram illustrating data storage provisions redirected through a de-duplication territory according to one exemplary embodiment.

Referring now to FIG. 2, a data structure diagram illustrates data storage provisions redirected through a de-duplication territory 230 according to one exemplary embodiment. A storage territory, such as a volume territory 210 or a snapshot territory 220A-220B, can be further subdivided into provisions. While a provision can be associated with an area of physical storage 240, the de-duplication technology discussed herein can use an intermediate de-duplication territory 230 to redirect multiple provisions within volume territories 210 or snapshot territories 220A-220B to consolidated areas within physical storage 240. For example, four provisions are illustrated as having been de-duplicated to point to the same provision within the physical storage 240.

The available capacity of the physical storage 240 within a storage server 2 can be made up of a number of hard disk drives 4A-4D. It should be appreciated that other storage nodes connected to the storage server 2 may also contribute physical capacity to the available physical capacity of the storage server 2. The available physical capacity can be divided into a number of unique, equally sized areas, called territories. According to embodiments, the size of a territory may be one terabyte (TB), a reduced size of 8 megabytes (MB), or any other territory size.

The available physical capacity may be further subdivided into units referred to herein as provisions. The provisions can comprise unique, equally sized areas of the available physical capacity. According to embodiments, provisions may be 1 MB in size, a reduced size of 512 kilobytes (KB), or any other size.

A provision can be further subdivided into chunks. Chunk size can be specified at the time of volume creation. According to one embodiment, the chunk size can be selected as 64 KB, or a reduced size of 8 KB. However, it should be appreciated that chucks of other sizes may be utilized.

When storage space is allocated for the first time within a volume, a whole territory may be allocated. When a subsequent allocation is made, a provision may be allocated. For example, the subsequent allocation may be related to a write to a snapshot. Provisions belonging to snapshots may be stored in special territories called snapshot territories 220A-220B. Snapshots are discussed in further detail with respect to FIG. 3.

Volume territories 210 and snapshot territories 220A-220B can have pointers that point to physical locations on disks where data associated with the territory is stored. De-duplication operations can use de-duplication territories 230 that have their own pointers and map tables. The de-duplication territories 230 can map multiple provisions to a single physical location. The mapping can support data consolidation and free up space since only one copy of duplicate data may need to be maintained on the physical storage 240 once the multiple provisions are remapped to the same physical storage using the de-duplication territories 230.

De-duplication can be performed using territory or provision granularity. When de-duplication is done in conjunction with snapshots, provision granularity can be used. For example, an operating system upgrade may involve about 200 MB of data for each client, much of that duplicated between clients. Within 200 MB of data, a large number of duplicate provisions may be identifiable.

Identifying duplicate provisions can be computationally time consuming. As such, de-duplication may be performed as a background process or as a background thread. Candidate provisions for de-duplication can be identified by calculating a signature for multiple provisions and searching for matching signatures. A signature can be a cyclic redundancy check (CRC), a checksum, a hash, a repetition code, a parity code, a hamming code, a substitution code, or any other deterministic signature generated over the data within the provision. Alternatively, a specified sampling of the data may be used as a signature. Generally, a signature can be considerably smaller than the actual data within a provision. The reduced size signature can provide a mechanism for quickly checking for data matches without doing a brute force comparison of every provision with every other provision. However, a brute force comparison may also be used according to embodiments.

According to various embodiments, signatures can be calculated for all provisions before determining collisions, or a selected subset of provisions can be calculated for collision checking. Also, some or all of the provisions may be continuously checked on a rolling basis. Heuristic approaches for specifying which provisions are checked for matching at specific times are addressed below.

Once the signature values for the candidate territories have been generated, a collision list can be provided by comparing the signatures with one another and identifying matching signatures. When signatures related to two or more provisions are identified as a collision, the provisions may be potentially de-duplicated. Provisions for potential de-duplication can be further verified as actual duplicates by reading and comparing the two provisions in their entirety. This brute force comparison is acceptable because it may only need to be performed on provisions having a fair likelihood of matching. The probability of two provisions not matching after their signatures have been matched can be quite low. This probability can be further decreased by perform two, or more, different types of signature calculations on provisions receiving a first pass signature collision.

When a pair of provisions is found to be a duplicated pair, the mapping structure corresponding to each provision can be marked. The marking can be made with a flag bit. The flag bit can indicate that the provisions are being handled by the de-duplication maps. These maps can map the duplicate provisions to the same space within the physical storage 240. The de-duplication maps may be similar to normal maps used within the storage system although the de-duplication maps can maintain physical pointers on a provision granularity while physical pointers may typically be provided on a territory granularity. For this reason, de-duplication maps can use additional memory. In order to limit the additional memory usage, a limit may be placed on the amount of data that a storage system will de-duplicate. For example, the de-duplication may be limited to 1 TB of storage. Any other limit size, including no limit at all, may also be applied according to embodiments.

After de-duplication, multiple provisions may point to the same location within the physical storage 240. The many-to-one mapping may be effectively hidden from the original provision map structures through the use of the de-duplication territories 230. It may only be necessary for functions in the lowest level of the storage system to be aware of the de-duplication mechanisms. The lowest levels can support the final layer of mapping from logical provisions to the corresponding location in physical storage 240. De-duplication can be transparent to higher level storage system operations.

De-duplicated provisions can be read-only snapshot provisions. Such provisions can be static and are not changed by new I/O operations. If a new write occurs on a writable snapshot related to such a provision, the snapshot mechanism can automatically perform the appropriate read-modify-write operation to create a writable version of that provision. This can be done without affecting the underlying de-duplicated snapshot provision. Thus, there may be no need for extra measures to manually reverse the de-duplication. Reversal of de-duplication can be provided automatically by a mechanism for supporting writeable snapshots.

De-duplication operations within a storage system can be supported through integration with Storage Resource Management (SRM) features provided within the storage system. SRM functions may include collecting and processing information lifecycle management (ILM) statistics. SRM functions may also provide workflow management to support scheduling for background, or housekeeping, operations performed within the storage system.

SRM features can support de-duplication through access time ILM statistics. These statistics can support de-duplicating data in the reverse order of territories being accessed. Thus, the de-duplication process can takes place first for provisions and territories that are not being actively used, or have the longest time recorded for their last access.

Incremental de-duplication can operate on a subset of the territories and provisions within a storage system. For example, after a software upgrade is applied to multiple user snapshots, a de-duplication can be performed specifically on territories and provisions related to the upgrade. SRM features can support determining which territories and provisions may be candidates for incremental de-duplication by collecting ILM statistics. For example, when software upgrades are completed, comparisons and signature analysis for recently accessed territories can focus on likely locations for identifying new duplicated data generated by the upgrade procedure. For example, when software upgrades were performed over the last three hours, ILM statistics can be considered to identify territories that have been accessed within three hours and provisions within the territories can be examined for duplicate data.

De-duplication can be CPU intensive and can otherwise impact resources within a storage system. A workflow module within the storage system can support scheduling de-duplication operations. Scheduling de-duplication operation when load on the storage system is low can reduce, or alleviate, impact on production I/O operations of the storage system due to resource consumption by the de-duplication operations.

Figure 3:
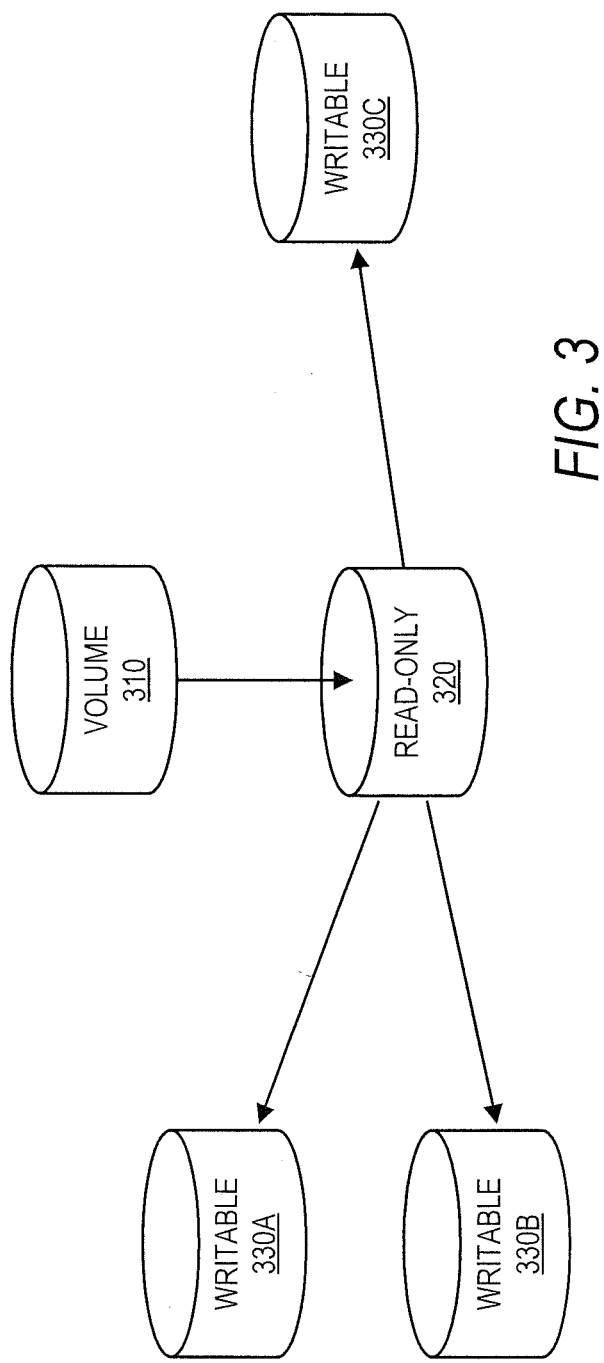
FIG. 3 is a block diagram illustrating a data storage volume having a read-only snapshot and multiple writable snapshots according to one exemplary embodiment.

Turning now to FIG. 3, a block diagram illustrates a data storage volume 310 having a read-only snapshot 320 and multiple writable snapshots 330A-330C (collectively writable snapshots 330) according to one exemplary embodiment. The multiple writable snapshots 330 may have been created from the common read-only snapshot 320. As user writes occur to the writeable snapshots 330, the contents of the writeable snapshots 330 grow and diverge from the read-only snapshot 320. Some of the user writes may involve software upgrades, or other consistent modifications, that write the same data to two or more of the writable snapshots 330. This data can be considered duplicate data. Removal of the multiple copies of duplicate data, or the act of de-duplication, can reduce the storage space required and also may improve caching efficiency.

Techniques for upgrading a single boot image and merging the changes into multiple user images can leverage a client-side agent that examines one image and merges the differences into another image. Such approaches rely upon client-side utilities, or agents, to determine and apply the differences caused by an upgrade. In contrast, de-duplication operations performed purely at the storage server can be less risky, or error prone, than client-side approaches. Furthermore, de-duplication techniques, as discussed herein, may apply more generally to duplicate data than an approached geared specifically towards upgrade scenarios. The de-duplication technique may also support a more operating system agnostic approach than the client-side agents.

Figure 4:
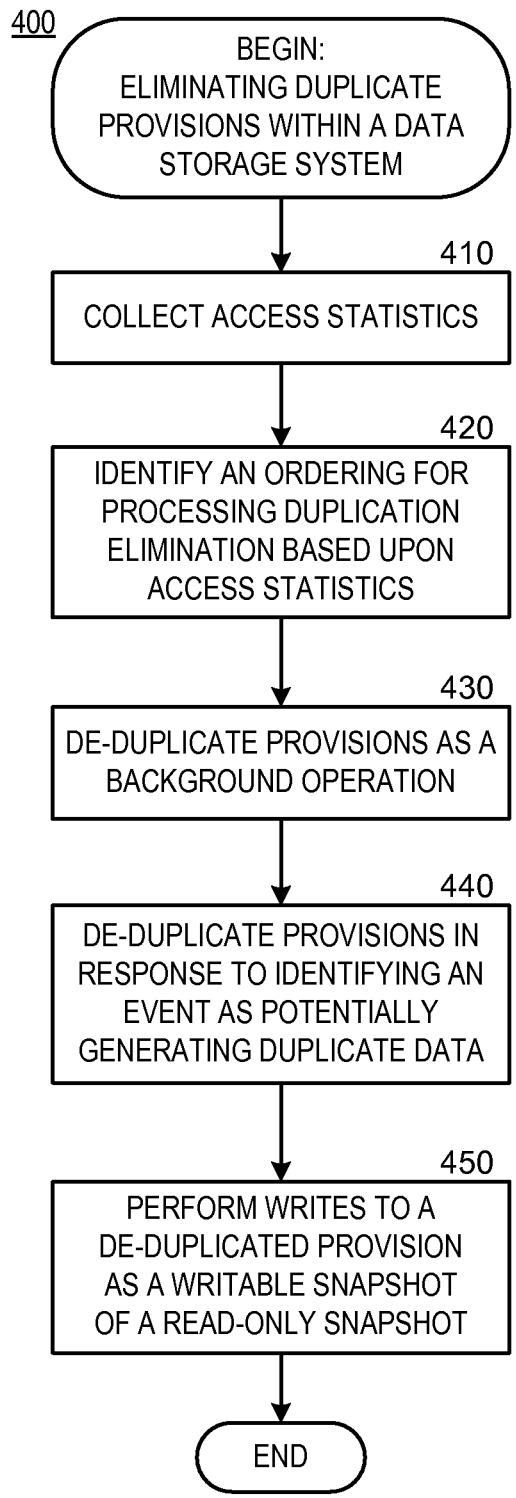
FIG. 4 is a logical flow diagram illustrating a process for eliminating duplicate provisions within a data storage system according to one exemplary embodiment.

Turning now to FIG. 4, additional details will be provided regarding the embodiments presented herein eliminating duplicate provisions within a data storage system. In particular, FIG. 4 is a flow diagram showing a routine 400 that illustrates aspects of a process for eliminating duplicate provisions within a data storage system according to one exemplary embodiment. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in parallel, or in a different order than those described herein.

The routine 400 can begin with operation 410 where ILM statistics, such as access time and access frequency, can be collected. This information collection can operate as part of a Storage Resource Management (SRM) module, or modules, within the storage system. In operation 420, an ordering for processing duplication elimination can be established based upon collected ILM access statistics. The ILM statistics can support identifying provisions that have been least recently accessed for priority de-duplication. This may be beneficial since the provisions are not likely to currently be in use. Such de-duplication ordering can act as something of an active archiving feature that removes duplicates in less often accessed data. The ILM statistics can also help to identify most recently accessed provisions and territories subsequent to a software upgrade or other event that may have introduced duplicates. Since similar data may have been installed or stored on multiple client images, identifying the provisions accessed during the installation or upgrade can provide likely candidates for de-duplication.

At operation 430, de-duplication operations are performed as background operations. De-duplication operations, as ordered in operation 420, may be scheduled as background operations. These operations can be performed as resources are available at the storage server to support the de-duplication tasks. ILM statistics, as collected in operation 410, may be used to determine periods of reduced load on the storage system. These periods of reduced load may be used for de-duplication operations thus reducing the impact on production storage I/O performance at the storage system.

At operation 440, data provisions can be de-duplicated in response to identifying an event as potentially generating duplicate data. For example, software upgrades, installations, or storage of data on multiple user images can be identified as potentially generating duplicate data. Performing duplicate identification on the provisions effected by the upgrade or installation shortly after the event can provide likely candidates for duplicated, or repeated, data that can then be de-duplicated.

At operation 450, writes to a de-duplicated provision can be performed as writes to a writable snapshot of a read-only snapshot. If a new write occurs on a writable snapshot related to such a provision, the snapshot mechanism can automatically perform the appropriate read-modify-write operation to create a writable branch off of the provision. This can be done without affecting the underlying de-duplicated snapshot provision. Thus, there may be no need for extra measures to manually reverse de-duplication. Reversal of de-duplication can be provided automatically by a mechanism for supporting writeable snapshots. The routine 400 can terminate after operation 450.

Figure 5:
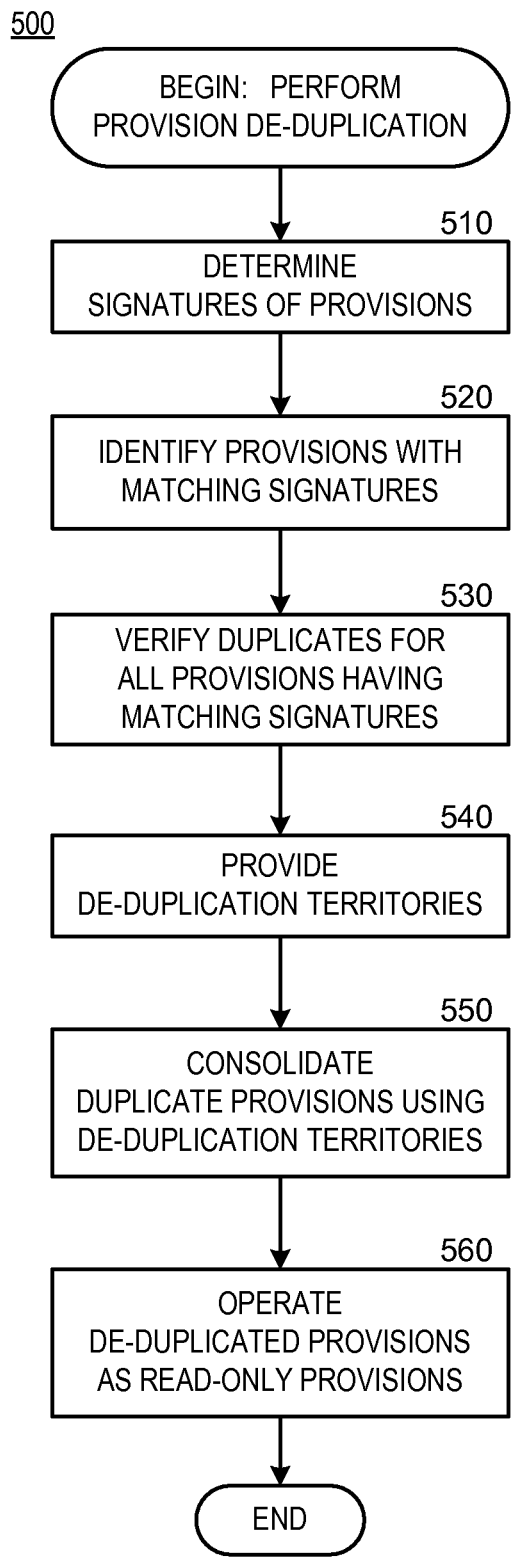
FIG. 5 is a logical flow diagram illustrating a process for provision de-duplication according to one exemplary embodiment.

Turning now to FIG. 5, additional details will be provided regarding the embodiments presented herein for eliminating duplicate provisions within a data storage system. In particular, FIG. 5 is a flow diagram illustrating a routine 500 that shows aspects of a process for provision de-duplication according to one exemplary embodiment. The routine 500 can begin with operation 510 where signatures of provisions can determined. The task of calculating provision signatures can be performed as a background operation. The task can be cued for particular territories or provisions to examine for duplication. Also, all provisions may be processed for signatures on a rolling basis or according to a specified schedule. At operation 520, provisions with matching signatures, as determined in operation 510, can be flagged as collisions on a match or collision list.

At operation 530, provisions with matching signatures can be verified as being complete duplicates of one another. If matching provisions are identified, they can be flagged for de-duplication. At operation 540, de-duplication territories 230 may be provided in support of de-duplication of provisions flagged as duplicate provisions.

At operation 550, duplicate provisions may be consolidated using the de-duplication territories 230 provided in operation 540. The de-duplication can result in multiple provisions pointing to the same location within the physical storage 240. An indirect many-to-one mapping may be provided through the de-duplication territories 230.

At operation 560, the de-duplicated provisions may be operated as read-only provisions. Since multiple images, or multiple provisions, may be pointing to the same de-duplicated storage, one particular provision may not write to the de-duplicated provision. If one particular provision causes a write to a shared de-duplicated provision, data could be inappropriately modified from the perspective of the other provisions that also point to the same storage provision. If a write operation is issued for a de-duplicated provision, that particular provision can instead branch off as a writeable snapshot so that the appropriate read-modify-write mechanism may occur as discussed with respect to operation 450 of FIG. 4. After operation 560, the routine 500 may terminate.

Figure 6:
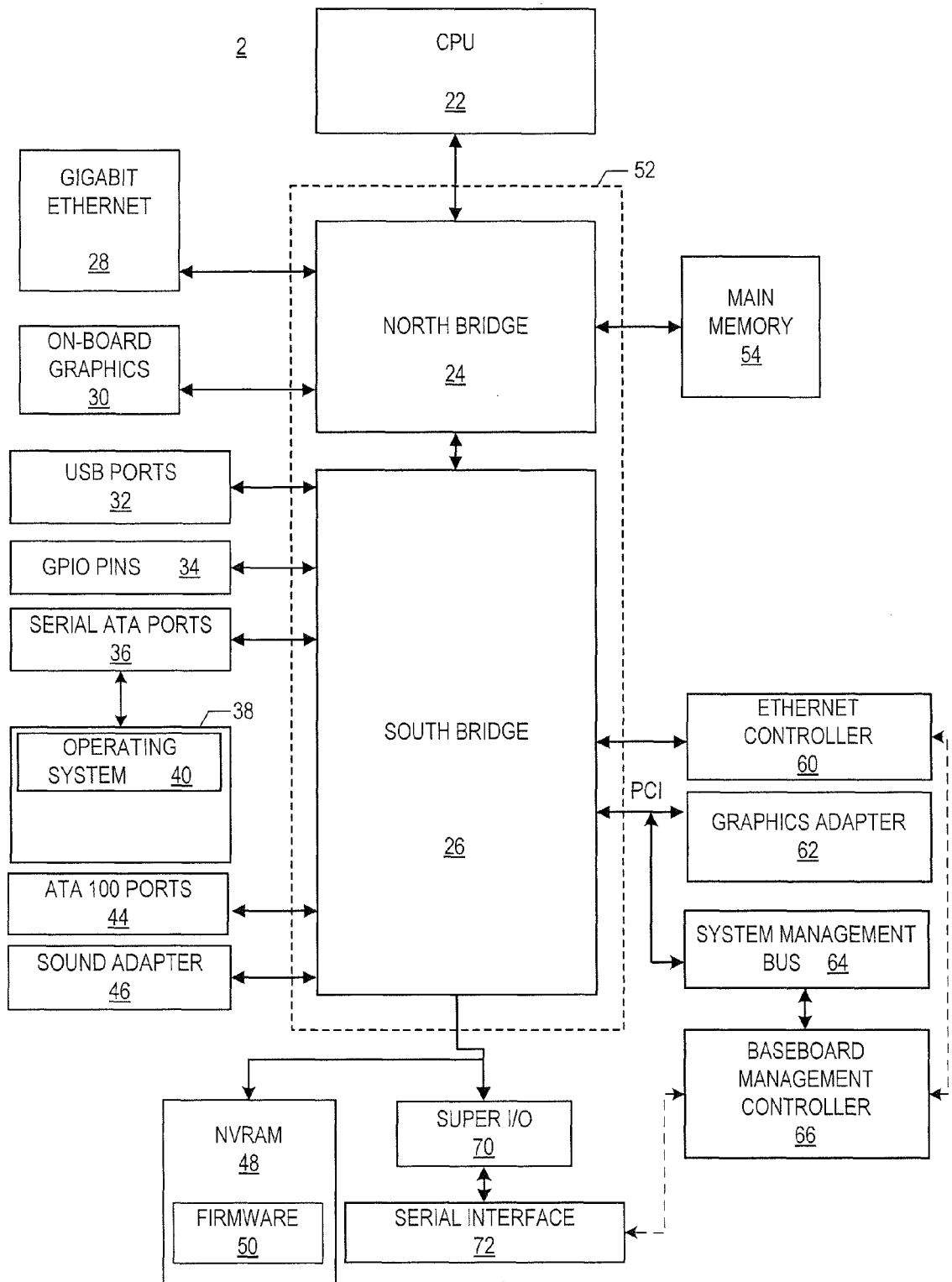
FIG. 6 is a computer architecture diagram illustrating a computer hardware architecture for a computing system capable of eliminating duplicate provisions within a data storage system.

FIG. 6 and the following discussion are intended to provide a brief, general description of a suitable computing environment in which the embodiments described herein may be implemented. While the technical details are presented herein in the general context of program modules that execute in conjunction with the execution of an operating system, those skilled in the art will recognize that the embodiments may also be implemented in combination with other program modules.

Generally, program modules include routines, programs, components, data structures, and other types of structures that perform particular tasks or implement particular abstract data types. Moreover, those skilled in the art will appreciate that the embodiments described herein may be practiced with other computer system configurations, including hand-held devices, multiprocessor systems, microprocessor-based or programmable consumer electronics, minicomputers, mainframe computers, and the like. The embodiments described herein may also be practiced in distributed computing environments where tasks are performed by remote processing devices that are linked through a communications network. In a distributed computing environment, program modules may be located in both local and remote memory storage devices.

In particular, FIG. 6 shows an illustrative computer architecture for a storage server computer 2 that may be utilized in the implementations described herein. Such an illustrative computer system may also describe a client computer system 8A-8N. The storage node computer 2 includes a baseboard, or "motherboard", which is a printed circuit board to which a multitude of components or devices may be connected by way of a system bus or other electrical communication paths. In one illustrative embodiment, a CPU 22 operates in conjunction with a chipset 52. The CPU 22 is a standard central processor that performs arithmetic and logical operations necessary for the operation of the computer. The storage node computer 2 may include a multitude of CPUs 22.

The chipset 52 includes a north bridge 24 and a south bridge 26. The north bridge 24 provides an interface between the CPU 22 and the remainder of the computer 2. The north bridge 24 also provides an interface to a random access memory ("RAM") used as the main memory 54 in the computer 2 and, possibly, to an on-board graphics adapter 30. The north bridge 24 may also include functionality for providing networking functionality through a gigabit Ethernet adapter 28. The gigabit Ethernet adapter 28 is capable of connecting the computer 2 to another computer via a network. Connections which may be made by the network adapter 28 may include LAN or WAN connections. LAN and WAN networking environments are commonplace in offices, enterprise-wide computer networks, intranets, and the internet. The north bridge 24 is connected to the south bridge 26.

The south bridge 26 is responsible for controlling many of the input/output functions of the computer 2. In particular, the south bridge 26 may provide one or more universal serial bus ("USB") ports 32, a sound adapter 46, an Ethernet controller 60, and one or more general purpose input/output ("GPIO") pins 34. The south bridge 26 may also provide a bus for interfacing peripheral card devices such as a graphics adapter 62. In one embodiment, the bus comprises a peripheral component interconnect ("PCI") bus. The south bridge 26 may also provide a system management bus 64 for use in managing the various components of the computer 2. Additional details regarding the operation of the system management bus 64 and its connected components are provided below.

The south bridge 26 is also operative to provide one or more interfaces for connecting mass storage devices to the computer 2. For instance, according to an embodiment, the south bridge 26 includes a serial advanced technology attachment ("SATA") adapter for providing one or more serial ATA ports 36 and an ATA 100 adapter for providing one or more ATA 100 ports 44. The serial ATA ports 36 and the ATA 100 ports 44 may be, in turn, connected to one or more mass storage devices storing an operating system 40 and application programs, such as the SATA disk drive 38. As known to those skilled in the art, an operating system 40 comprises a set of programs that control operations of a computer and allocation of resources. An application program is software that runs on top of the operating system software, or other runtime environment, and uses computer resources to perform application specific tasks desired by the user.

According to one embodiment of the invention, the operating system 40 comprises the LINUX operating system. According to another embodiment of the invention the operating system 40 comprises the WINDOWS SERVER operating system from MICROSOFT CORPORATION. According to another embodiment, the operating system 40 comprises the UNIX or SOLARIS operating system. It should be appreciated that other operating systems may also be utilized.

The mass storage devices connected to the south bridge 26, and their associated computer-readable media, provide non-volatile storage for the computer 2. Although the description of computer-readable media contained herein refers to a mass storage device, such as a hard disk or CD-ROM drive, it should be appreciated by those skilled in the art that computer-readable media can be any available media that can be accessed by the computer 2. By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, HD-DVD, BLU-RAY, or other optical storage, magnetic cassettes, magnetic tape, magnetic disk storage or other magnetic storage devices, or any other medium which can be used to store the desired information and which can be accessed by the computer.

A low pin count ("LPC") interface may also be provided by the south bridge 6 for connecting a "Super I/O" device 70. The Super I/O device 70 is responsible for providing a number of input/output ports, including a keyboard port, a mouse port, a serial interface 72, a parallel port, and other types of input/output ports. The LPC interface may also connect a computer storage media such as a ROM or a flash memory such as a NVRAM 48 for storing the firmware 50 that includes program code containing the basic routines that help to start up the computer 2 and to transfer information between elements within the computer 2.

As described briefly above, the south bridge 26 may include a system management bus 64. The system management bus 64 may include a BMC 66. In general, the BMC 66 is a microcontroller that monitors operation of the computer system 2. In a more specific embodiment, the BMC 66 monitors health-related aspects associated with the computer system 2, such as, but not limited to, the temperature of one or more components of the computer system 2, speed of rotational components (e.g., spindle motor, CPU Fan, etc.) within the system, the voltage across or applied to one or more components within the system 2, and the available or used capacity of memory devices within the system 2. To accomplish these monitoring functions, the BMC 66 is communicatively connected to one or more components by way of the management bus 64. In an embodiment, these components include sensor devices for measuring various operating and performance-related parameters within the computer system 2. The sensor devices may be either hardware or software based components configured or programmed to measure or detect one or more of the various operating and performance-related parameters. The BMC 66 functions as the master on the management bus 64 in most circumstances, but may also function as either a master or a slave in other circumstances. Each of the various components communicatively connected to the BMC 66 by way of the management bus 64 is addressed using a slave address. The management bus 64 is used by the BMC 66 to request and/or receive various operating and performance-related parameters from one or more components, which are also communicatively connected to the management bus 64.

It should be appreciated that the computer 2 may comprise other types of computing devices, including hand-held computers, embedded computer systems, personal digital assistants, and other types of computing devices known to those skilled in the art. It is also contemplated that the computer 2 may not include all of the components shown in FIG. 6, may include other components that are not explicitly shown in FIG. 6, or may utilize an architecture completely different than that shown in FIG. 6.

Based on the foregoing, it should be appreciated that technologies for eliminating duplicate provisions within a data storage system are presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A method for removing duplicate provisions within a data storage system, the method comprising:
    providing a plurality of storage territories, each of the storage territories being subdivided into one or more provisions within a physical storage of the data storage system;
    providing a de-duplication territory;
    identifying a plurality of duplicate provisions among the one or more provisions within the physical storage of the data storage system;
    allocating a new provision within the de-duplication territory for each of the plurality of duplicate provisions for consolidating the plurality of duplicate provisions;
    remapping each of the plurality of duplicate provisions to one of the newly allocated provisions within the de-duplication territory; and
    consolidating the newly allocated provisions associated with each of the plurality of duplicate provisions within the de-duplication territory to point to a single physical storage provision within the physical storage, wherein the plurality of duplicate provisions are indirectly mapped to the single physical storage provision within the physical storage through the de-duplication territory.

2. The method of claim 1, further comprising writing to consolidated provisions as a writable snapshot branched off of a read-only snapshot.

3. The method of claim 1, wherein identifying duplicate provisions occurs in response to detecting a software upgrade.

4. The method of claim 1, wherein identifying duplicate provisions comprises determining provision signatures and identifying provisions with matching signatures.

5. The method of claim 4, further comprising verifying provisions with matching signatures by performing a full comparison of the provisions.

6. The method of claim 1, further comprising scheduling provisions for duplicate identification and consolidation based on a least-accessed-first ordering.

7. The method of claim 1, further comprising scheduling provisions for duplicate identification and consolidation during periods of reduced storage access.

8. A non-transitory computer storage medium having computer-executable instructions stored thereon which, when executed by a computer system, cause the computer system to:
- provide a plurality of storage territories, each of the storage territories being subdivided into one or more provisions within a physical storage;
- provide a de-duplication territory;
- identify a plurality of duplicate provisions among the one or more provisions within the physical storage;
- allocate a new provision within the de-duplication territory for each of the plurality of duplicate provisions for consolidating the plurality of duplicate provisions;
- remap each of the plurality of duplicate provisions to one of the newly allocated provisions within the de-duplication territory; and
- consolidate the newly allocated provisions associated with each of the plurality of duplicate provisions within the de-duplication territory to point to a single physical storage provision within the physical storage, wherein the plurality of duplicate provisions are indirectly mapped to the single physical storage provision within the physical storage through the de-duplication territory.

9. The non-transitory computer storage medium of claim 8, having further computer-executable instructions stored thereon which, when executed by the computer system, cause the computer system to write to consolidated provisions as a writable snapshot branched off of a read-only snapshot.

10. The non-transitory computer storage medium of claim 8, wherein identifying duplicate provisions occurs in response to detecting a software upgrade.

11. The non-transitory computer storage medium of claim 8, wherein identifying duplicate provisions comprises determining provision signatures and identifying provisions with matching signatures.

12. The non-transitory computer storage medium of claim 11, having further computer-executable instructions stored thereon which, when executed by the computer system, cause the computer system to verify provisions with matching signatures by performing a full comparison of the provisions.

13. The non-transitory computer storage medium of claim 8, having further computer-executable instructions stored thereon which, when executed by the computer system, cause the computer system to schedule provisions for duplicate identification and consolidation based on a least-accessed-first ordering.

14. The non-transitory computer storage medium of claim 8, having further computer-executable instructions stored thereon which, when executed by the computer system, cause the computer system to schedule provisions for duplicate identification and consolidation during periods of reduced storage access.

15. A data storage system comprising:
- a storage server;
- a physical storage associated with the storage server;
- a processing unit associated with the storage server;
- and one or more modules for execution on the processing unit, operable to:
- provide a plurality of storage territories, each of the storage territories being subdivided into one or more provisions within the physical storage;
- provide a de-duplication territory;
- identify a plurality of duplicate provisions among the one or more provisions within the physical storage;
- allocate a new provision within the de-duplication territory for each of the plurality of duplicate provisions for consolidating the plurality of duplicate provisions;
- remap each of the plurality of duplicate provisions to one of the newly allocated provisions within the de-duplication territory; and
- consolidate the newly allocated provisions associated with each of the plurality of duplicate provisions within the de-duplication territory to point to a single physical storage provision within the physical storage, wherein the plurality of duplicate provisions are indirectly mapped to the single physical storage provision within the physical storage through the de-duplication territory.

16. The data storage system of claim 15, wherein the one or more modules for execution on the processing unit are further operable to write to consolidated provisions as a writable snapshot branched off of a read-only snapshot.

17. The data storage system of claim 15, wherein identifying duplicate provisions occurs in response to detecting a software upgrade.

18. The data storage system of claim 15, wherein identifying duplicate provisions comprises determining provision signatures and identifying provisions with matching signatures.

19. The data storage system of claim 18, wherein the one or more modules for execution on the processing unit are further operable to verify provisions with matching signatures by performing a full comparison of the provisions.

20. The data storage system of claim 15, wherein the one or more modules for execution on the processing unit are further operable to schedule provisions for duplicate identification and consolidation during periods of reduced storage access.

* * * * *